G. F. GEBHARDT.
DIFFERENTIAL PRESSURE GAGE.
APPLICATION FILED JULY 11, 1912.
1,169,795.
Patented Feb. 1, 1916.
2 SHEETS—SHEET 2.
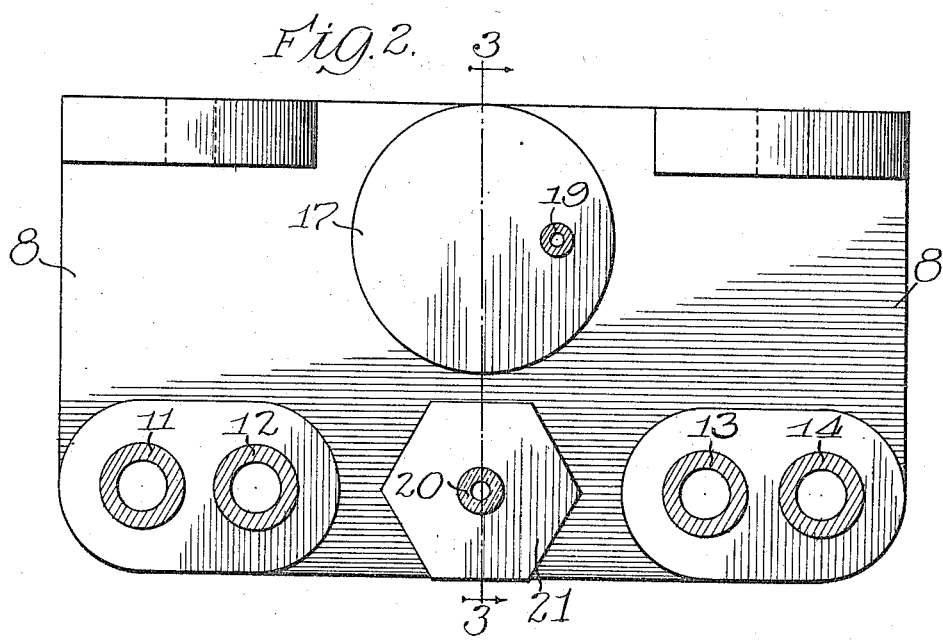
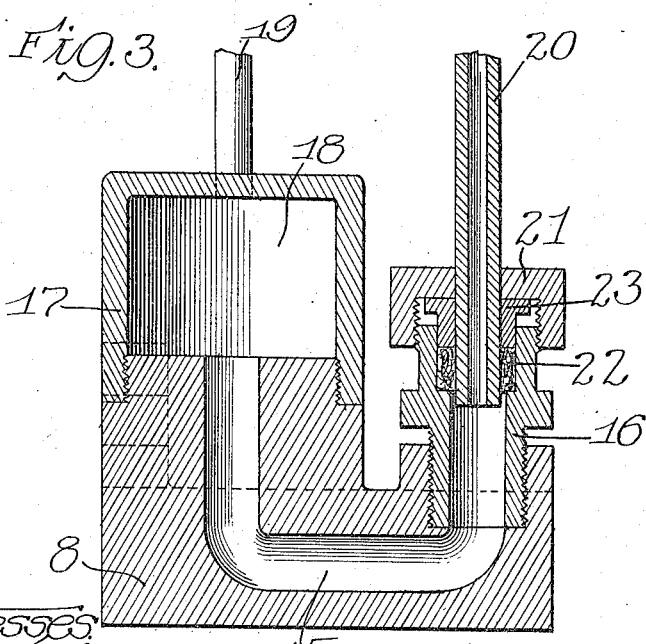

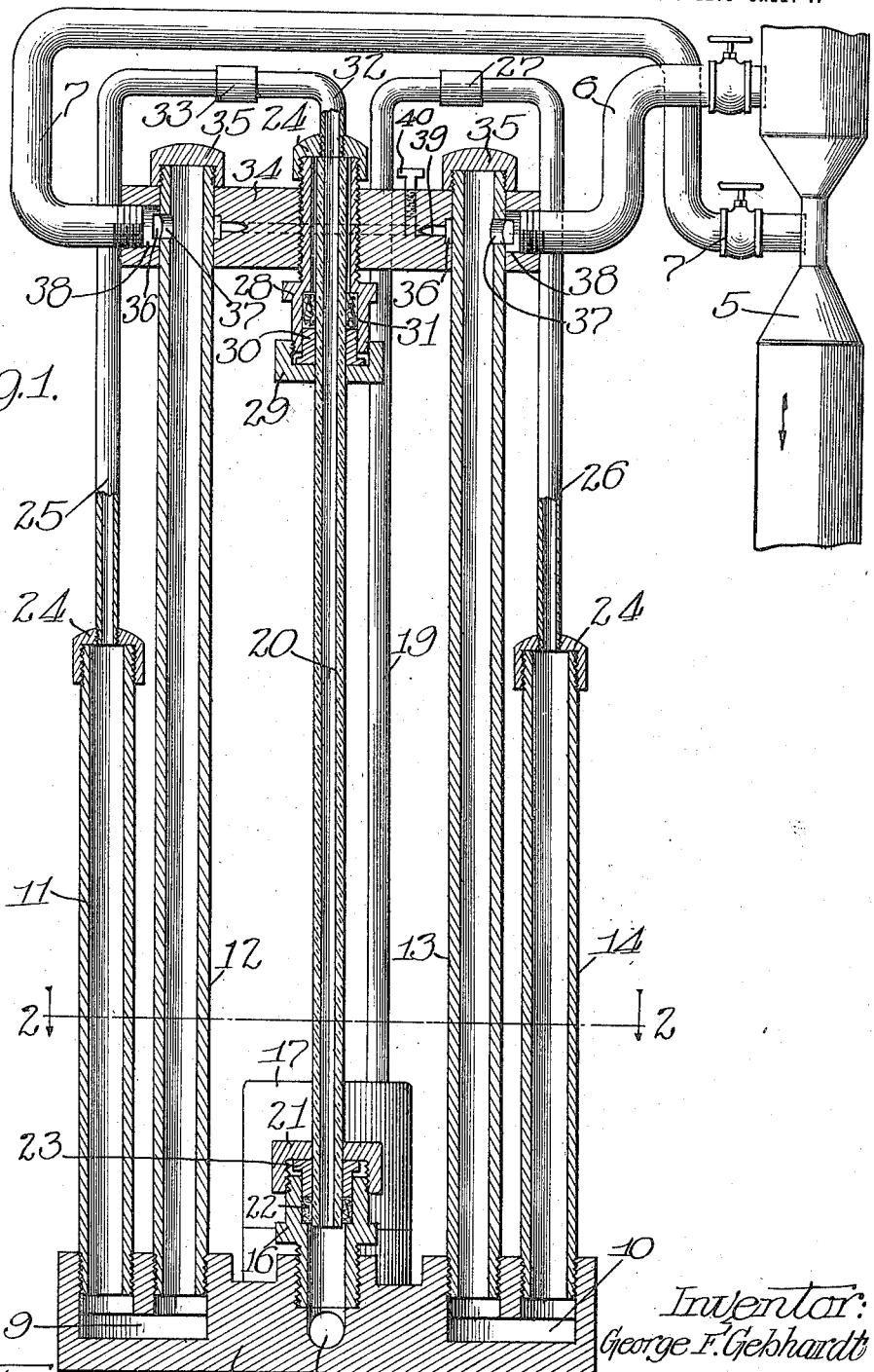

UNITED STATES PATENT OFFICE.

GEORGE F. GEBHARDT, OF CHICAGO, ILLINOIS, ASSIGNOR TO GEBHARDT METER COMPANY, OF CHICAGO, ILLINOIS, A CORPORATION OF ILLINOIS.

DIFFERENTIAL-PRESSURE GAGE.

1,169,795.

Specification of Letters Patent.

Patented Feb. 1, 1916.

Application filed July 11, 1912. Serial No. 708,759.

*To all whom it may concern:*

Be it known that I, GEORGE F. GEBHARDT, a citizen of the United States, residing at Chicago, in the county of Cook and State of Illinois, have invented certain new and useful Improvements in Differential-Pressure Gages, of which the following is a specification.

This invention relates to a differential pressure gage or register for measuring or indicating the velocity or differential pressure of a moving fluid, and the principal object of the invention is to provide a device of the class described by means of which a liquid of any desired specific gravity may be employed to register the dynamic pressure or the velocity of any fluid, either liquid or gas.

Another object of the invention is to prevent intermingling of the medium for recording or registering the differential pressure with the fluid, of which the pressure or velocity is to be measured, thereby preventing errors arising from condensation and the like.

For the attainment of these ends and the accomplishment of other new and useful objects, as will appear, the invention consists in the features of novelty, in the construction, combination and arrangement of the several parts generally shown in the accompanying drawings and described in the specification, but more particularly pointed out in the appended claims.

In the drawings Figure 1 is a view in elevation with parts shown in section of a device constructed in accordance with the principles of my invention; Fig. 2 is a plan view of the device taken on the line 2—2 of Fig. 1; Fig. 3 is a detail sectional view taken on the line 3—3 of Fig. 2.

In measuring the differential or velocity pressure of the fluid, it is sometimes necessary to provide means to compensate for errors arising from condensation and the like, such, for example, as might arise in a meter for recording the pressure or velocity of steam. If a fluid of specific gravity many times as great as the specific gravity of a fluid whose pressure is to be measured, is employed for measuring or recording the changes in pressure, the movement of the recording medium is so slight for a slight difference in pressure of the fluid to be measured that the change is inappreciable. This may happen, for example, when mercury is employed for measuring the pressure of steam or air.

The present invention provides a means for sealing the medium for measuring or indicating the differential pressures from the fluid of which the differential pressure or velocity is to be measured, so that there will be no danger of intermingling of the respective fluids and all of the pressure will be accurately imparted to the measuring medium. At the same time, the medium for measuring the differential pressure is separated from the sealing fluid so that there is also no danger of intermingling of the sealing fluid and the fluid which is to be employed for registering the differences in pressure.

In the present embodiment of my invention, the device employed consists of a plurality of U-shaped tubes, preferably three in number, and connected in series with the free ends of the outer tubes connected to the dynamic and static pressure tubes of a fluid supply system, of which the pressure or velocity is to be measured.

Although in the present exemplification of the invention, this device is shown as applied to a specific tube or measuring device, it is understood that the device is also applicable to any fluid supply system where difference of pressure is to be measured.

Referring now more particularly to the drawings, the numeral 5 designates generally a fluid supply tube in which the pressure is to be measured. This tube comprises what is known as a Venturi tube and connected thereto is a dynamic tube 6 and a static tube 7. The differential pressure gage proper comprises a series of U-shaped tubes which are connected together in series and with the free extremities of the tubes connected to the dynamic tube 6 and the static tube 7.

In the present embodiment of the invention, the gage comprises a base 8 having passages 9 and 10 therein formed with threaded edges to receive the correspondingly threaded edges of the tubes 11, 12, 13 and 14. Another passage 15 is provided, shown more clearly in Fig. 3, having a member 16 threaded into the passage at one end and a cap 17 forming a chamber or seal pot 18 at the other end of the passage 15. Connected to the cap 17 is a tube 19 which has communication with the chamber 18 within the cap and a tube 20 is connected to the member 16 in any suitable manner, such for example, as by inserting it through a threaded perforated cap 21 adapted to be secured to the member 16, a space being provided within the member and surrounding the end of the tube 20 to receive packing material 22 against which a gland 23 may be pressed by threading the cap 21 upon the member 16. The tops of the tubes 12 and 13 preferably extend above their corresponding tubes 11 and 14, respectively, and the latter tubes are preferably provided with caps 24 in which the tubes 25 and 26 are connected respectively. One of these tubes as 26 is connected to the tube 19 by means of a coupling 27 and the other tube 25 is connected to the top of the tube 20 in any suitable manner, such, for example, as that shown by Fig. 1, in which it will be seen that a threaded member 28 surrounds the tube 20 at its upper end and is provided at one end with a perforated threaded cap 29, gland 30, and packing material 31 to form a fluid tight connection about the tube 20. At the other end the threaded member 28 is provided with a cap 24, into which a tube 32 is threaded. This tube 32 is connected with the tube 25 by means of a coupling 33.

Thus it will be seen that the device comprises three separate U tubes all connected in series with the tubes 12 and 13 forming the upper extremities thereof. These tubes 12 and 13 are connected to the tubes 6 and 7 in any desired or suitable manner, such for example, as that shown by Fig. 1, in which it will be seen that the upper ends of the tubes are inserted through perforations in a member 34 and provided at their upper ends with suitable closing caps 35. The perforations in the member 34 are each formed with an enlarged recess 36 surrounding the tubes and the tubes are each provided with one or more suitable perforations 37, which form communication with the enlarged recesses 36. Extending laterally from the recesses 36 are openings 38 preferably threaded to receive the ends of correspondingly threaded tubes, and in the present exemplification of the invention, is adapted to receive the ends of the tubes 6 and 7. As shown in the drawing, the tube 6 has communication with the tube 13 and the tube 7 has communication with the tube 12.

It will be seen that the tubes connected to the ends of the tubes 11 and 14 are preferably smaller in diameter than the tubes 11, 12, 13 and 14, and the smaller tubes are preferably all of the same bore, that is, have the same sized opening. One of the tubes as 20 is composed of transparent material, such, for example, as glass, so that the height of liquid therein may be readily discerned. The other tubes may be of any desired or suitable material varying, of course, with the kind of liquid employed in the tubes. The U tubes formed by the tubes 11, 12 and by 13 and 14, will be designated as the sealing tubes, since they are provided with fluid for preventing the fluid of which the pressure or velocity is to be measured, from coming in contact with the fluid contained in the registering or recording U tube formed by the tubes 19 and 20. The sealing tubes are provided with liquid of any desired or suitable kind, preferably of such kind that it will not mix or combine with the fluid to be measured and the central U tube is provided with fluid of any desired or suitable kind and of any specific gravity. Preferably, the liquid in the sealing tubes is disposed so that the height of the fluid in each leg of each of the tubes is substantially equal under normal conditions and so that it will be below the ends of the tubes 25 and 26. In the central or registering U tube, the liquid is preferably disposed so that the liquid will rise in the tube 20 to indicate a variation of pressure, the upper surface of the other leg of the liquid being disposed in the chamber 18. Thus, it will be seen that between the sealing tubes and the central or recording tube is a space which may be filled with air, gas or other fluid. It will be evident, however, that pressure exerted upon the sealing tubes from the tube 5 by means of the tubes 6 and 7 will be transmitted to the indicating tube 20, the difference in pressure being evidenced by a change in height in the liquid in the tube 20. Since the tubes 19 and 20 are small in comparison with the sealing tubes, a change in pressure applied to the liquid in the sealing tubes will not produce any appreciable movement of the liquid in the sealing tubes, and minute variations of the differential pressure in the dynamic and static tubes will be accurately registered or indicated by the tube 20. This tube, of course, may be provided with graduations or marks to indicate the changes of differential pressure.

From this description, the construction and operation of the preferred form of my invention will be readily understood. In practice, the liquid in the central U tube is preferably colored so that the changes in height of the liquid in the tube 20 may be more readily discernible. The liquid in the sealing tubes is preferably mercury, but, of course, may be any desired or suitable substance.

Of course, it is understood that this device, although particularly described as being employed for registering or indicating differential pressures, may also be used for indicating the velocity of the medium to be measured as well as for determining the quantity of flow of the material in the pipe to which the dynamic and static connections are made. A chart or diagram is commonly employed in connection with a device of this kind for determining the velocity and flow as well as the pressure corresponding to any indicated position of the fluid within the indicating tube.

For the purpose of opening and closing communication between the gage and the fluid supply tube, the tubes 6 and 7 are commonly provided with valves. A by-pass 39 is provided in the member 34 extending between the recesses 36 which surround the tubes 12 and 13, and disposed in the by-pass is a valve 40 adapted to open and close the passage. The object of this construction is to provide means to equalize the pressure at both ends of the tubes 12 and 13, as for example, when the gage is being placed in communication with the supply tube 5. The by-pass valve 40 is first opened, then the valve in one of the tubes 6 or 7, the pressure on both tubes 12 and 13 is then the same, and by opening the valve in the other tube 6 or 7 and closing the valve 40 the differential pressure is obtained which is registered or indicated by tube 20.

While I have thus described the preferred embodiment of my invention, it is evident that others skilled in the arts to which this relates may make various changes in the construction, combination and arrangement of the several parts without departing from the spirit and scope of my invention.

What I claim is:

1. A differential pressure gage comprising a base member with a U-shaped passage therein, a cap member secured to the base at one end of the passage forming a seal pot, a tube connected through the said cap, a transparent tube connected to the other end of the passage, the said tubes constituting with the passage in the base member a U tube having a seal pot in one leg of the tube, and means connected to the ends of the said tubes forming a fluid seal for transmitting pressure to the said tubes.

2. The combination with a differential pressure gage comprising a base member with passages therein, tubular members secured in the ends of the passages and forming a plurality of U-shaped tubes, means to connect the ends of the U-shaped tubes together, of means forming a differential source of pressure supply and tubular connections from said source of pressure supply to the ends of the outer tubes.

3. In a differential pressure gage, the combination with a base member having passages therein of tubular members secured to the ends of the passages and forming U tubes, one of the U tubes being smaller in diameter than the others and connected in series at both ends with one of the other U tubes, and means to connect the other ends of the outer U tubes to a suitable source of supply.

4. A differential pressure gage comprising members forming two U tubes of other members smaller in diameter forming the legs of another U tube each leg being connected to only one of the first mentioned U tubes, a seal pot in connection with one of the said smaller tubes, and means forming communication between the other smaller tube and the seal pot, the other smaller tube being composed of transparent material to show the height of fluid therein and means forming connection with the ends of the outer U tubes and a source of differential pressure.

5. In a differential pressure gage, the combination of three U tubes connected in series, the outer tubes forming a fluid seal for the inner tube, the free extremities of the said sealing tubes being provided with means to form connection between them comprising a perforated plate through which the ends of the tube are inserted, a cap to seal the protruding ends of the tubes, a recess in the plate surrounding the tubes and a laterally extending threaded opening from each of the recesses, the tubes being perforated to register with the recesses in the plate whereby communication may be had through the lateral openings with the interior of the tubes.

6. A differential pressure gage comprising a base member formed with U-shaped passages therein, tubular members disposed in the ends of the passages forming sealing tubes, a hollow cap secured over the end of another passage forming a seal pot, a threaded member connected to the other end of the passage communicating with the seal pot, a glass tube disposed in the threaded member, means to secure the glass tube to the member forming a fluid tight joint therefor, a tube forming communication with the other end of the glass tube and one end of one of the sealing U tubes, means forming fluid tight connection at the other end of the glass tube and another tube substantially as large in inside diameter as the glass tube forming communication between the seal pot and one end of the other sealing U tube, the free ends of the sealing U tube being provided with means forming connection therewith, comprising a perforated plate through which the ends of the tube project, a cap for each of said tubes, a recess extending laterally from the perforation in the plate and a tubular connection disposed in said recess, the end of the tube being provided with an opening registering with said recess.

7. The combination with a pressure supply tube, of a differential pressure gage having a plurality of U tubes connected in series, a perforated member, the free ends of the outer tubes being disposed in the perforated member, the free ends each being provided with stoppers at the end and having lateral perforations, an enlarged recess in the plate surrounding each free end adjacent the lateral perforation, the perforated member being formed with a passage connecting the recesses at the free ends, means connecting each of the free ends separately to the pressure supply tube, and an adjustable valve in said passage.

In testimony whereof I have signed my name to this specification, in the presence of two subscribing witnesses, on this 2nd day of July A. D. 1912.

GEORGE F. GEBHARDT.

Witnesses:
KENT W. WONNELL,
CHARLES H. SEEM.

Copies of this patent may be obtained for five cents each, by addressing the "Commissioner of Patents, Washington, D. C."